US009566549B1

(12) United States Patent
Nittler (10) Patent No.: US 9,566,549 B1
(45) Date of Patent: Feb. 14, 2017

(54) APPARATUS AND METHOD FOR CLEANING GAS STREAMS FROM BIOMASS COMBUSTION

(71) Applicant: RIO GRANDE VALLEY SUGAR GROWERS, INC., Santa Rosa, TX (US)

(72) Inventor: Mark H. Nittler, Santa Rosa, TX (US)

(73) Assignee: Rio Grande Valley Sugar Growers, Inc., Santa Rosa, TX (US)

( * ) Notice: Subject to any disclaimer, the term of this patent is extended or adjusted under 35 U.S.C. 154(b) by 12 days.

(21) Appl. No.: 14/805,170

(22) Filed: Jul. 21, 2015

Related U.S. Application Data

(60) Provisional application No. 62/029,295, filed on Jul. 25, 2014.

(51) Int. Cl.
  *B01D 53/50*   (2006.01)
  *B01D 53/78*   (2006.01)
  *B01D 53/79*   (2006.01)

(52) U.S. Cl.
  CPC ............... *B01D 53/50* (2013.01); *B01D 53/79* (2013.01); *B01D 2252/00* (2013.01)

(58) Field of Classification Search
  CPC ......... B01D 53/68; B01D 53/78; B01D 53/79; B01D 53/90; B01D 2257/2045; B01D 2257/302; B01D 2258/05; B01D 2259/124; B01D 53/1481; B01D 53/38; B01D 53/40; B01D 53/50; B01D 53/504
  See application file for complete search history.

(56) References Cited

U.S. PATENT DOCUMENTS

| | | | |
|---|---|---|---|
| 3,966,418 A | 6/1976 | Frevel et al. |
| 4,019,444 A | 4/1977 | Kleeberg et al. |
| 4,039,307 A | 8/1977 | Bondor |
| 4,369,167 A | 1/1983 | Weir, Jr. |
| 5,133,190 A | 7/1992 | Abdelmalek |
| 5,173,093 A | 12/1992 | Johnson et al. |
| 5,391,220 A | 2/1995 | Patterson |
| 5,403,568 A | 4/1995 | Stowe, Jr. |
| 5,534,230 A | 7/1996 | Johnson et al. |
| 5,792,238 A | 8/1998 | Johnson et al. |

(Continued)

FOREIGN PATENT DOCUMENTS

| | | | | |
|---|---|---|---|---|
| DE | 69806905 D1 | * | 9/2002 | .......... B01D 53/504 |
| EP | 1043057 A1 | * | 10/2000 | .......... B01D 53/505 |
| EP | 2265357 A1 | * | 12/2010 | .......... B01D 53/504 |

*Primary Examiner* — Timothy Vanoy
(74) *Attorney, Agent, or Firm* — Dykema Gossett P.L.L.C.

(57) ABSTRACT

A horizontal scrubber may be configured for removal of sulfur dioxide and particulate matter from a gaseous stream derived from the combustion of biomass, including, for example, sugar cane bagasse. The scrubber may include a horizontally disposed housing including an inlet configured to receive a gas stream derived from combusted biomass and an outlet. The scrubber may further include a manifold of liquid nozzles disposed within the housing that are configured to provide a spray of liquid droplets in a co-current orientation to the gas stream. An array of tubes may be oriented adjacent to the manifold of liquid nozzles and may be configured to receive the gas stream and liquid droplets from the nozzle array, but providing minimal resistance to material flow. To encourage flow, members of the tube array may include circular walls with a substantially uniform cross section.

16 Claims, 5 Drawing Sheets

(56) References Cited

U.S. PATENT DOCUMENTS

| | | | |
|---|---|---|---|
| 6,102,377 | A | 8/2000 | Doughty |
| 6,110,256 | A | 8/2000 | Reynolds et al. |
| 6,302,945 | B1 | 10/2001 | Altman et al. |
| 6,488,740 | B1 | 12/2002 | Patel et al. |
| 6,562,304 | B1 | 5/2003 | Mizrahi |
| 6,923,852 | B2 | 8/2005 | Vrotsos |
| 7,022,296 | B1 | 4/2006 | Khang et al. |
| 7,297,182 | B2 | 11/2007 | Ray et al. |
| 7,300,496 | B2 | 11/2007 | Taylor |
| 8,088,198 | B2 | 1/2012 | Bengtsson et al. |
| 8,137,649 | B2 | 3/2012 | Ghosh et al. |
| 8,192,529 | B2 * | 6/2012 | Gatton, Jr. .............. B01D 53/83 422/169 |
| 8,226,754 | B2 | 7/2012 | Klingspor et al. |
| 8,236,092 | B1 | 8/2012 | Richards |
| 8,865,098 | B2 * | 10/2014 | Suchak .................. B01D 53/73 422/170 |
| 2002/0061270 | A1 | 5/2002 | Osborne |
| 2005/0000243 | A1 * | 1/2005 | Hwang .................. B01D 53/14 62/317 |
| 2008/0038173 | A1 | 2/2008 | Bradburn et al. |
| 2016/0220949 | A1 * | 8/2016 | Tripodi .................. B01D 3/008 |

\* cited by examiner

APPARATUS AND METHOD FOR CLEANING GAS STREAMS FROM BIOMASS COMBUSTION

CROSS REFERENCE TO RELATED APPLICATIONS

This application claims priority to U.S. Provisional Patent Application No. 62/029,295 filed Jul. 25, 2014. The disclosure of U.S. Provisional Patent Application No. 62/029,295 is herein fully incorporated by reference.

FIELD

The present application relates to an apparatus and method for decontaminating a flue gas stream. The application also relates to processing of flue gas from a sugar cane bagasse boiler and methods for conditioning that flue gas for release into the environment.

BACKGROUND

Flue gas may include any number of contaminant species including particulate matter, acids, and/or various oxides, including, for example, $SO_2$, $SO_3$, HCl, and nitrous oxides. Contaminant impurities may be detrimental to the environment, and it may be required to remove contaminant impurities to at least a statutory level of regulation. A number of processes have been designed to facilitate removal of contaminants and purification of flue gas. However, there remains a need for flue gas processing systems that more efficiently remove contaminant gases. Particularly, there is a need for cost effective strategies of flue gas processing that may be applied and/or retrofit in existing structures with certain restrictions.

SUMMARY

A horizontal scrubber may be configured for removal of sulfur dioxide and particulate matter from a gaseous stream derived from the combustion of biomass, including, for example, sugar cane bagasse. The scrubber may include a horizontally disposed housing including an inlet configured to receive a gas stream derived from combusted biomass and an outlet. The scrubber may further include a manifold of liquid nozzles disposed within the housing that are configured to provide a spray of liquid droplets in a co-current orientation to the gas stream. An array of tubes may be oriented adjacent to the manifold of liquid nozzles and may be configured to receive the gas stream and liquid droplets from the nozzle array, but providing minimal resistance to material flow. To encourage flow, members of the tube array may include circular walls with a substantially uniform cross section.

DETAILED DESCRIPTION

The following terms as used herein should be understood to have the indicated meanings.

When an item is introduced by "a" or "an," it should be understood to mean one or more of that item.

"Comprises" means includes but is not limited to.

"Comprising" means including but not limited to.

"Having" means including but not limited to.

This disclosure is directed to wet condensing scrubbers, flue gas cleaning systems including a wet condensing scrubber and an electrostatic precipitation (ESP) unit, and methods for removing particulate matter and decreasing amounts of contaminant gases in a gas stream derived from combustion of sugar cane bagasse or other biomass.

In some embodiments, apparatuses as described herein may be installed within facility structures including those with limited headspace. For example, in some embodiments, a wet condensing scrubber or condensing scrubber and ESP unit may be included within a housing having a substantially horizontal orientation and which constrains the bulk flow of flue gas in a flowpath substantially parallel to the floor. Contaminants including, for example, particulate matter and/or gaseous species including various oxides may be suitably removed without relying on gravitational settling or multi-stage countercurrent injection of scrubber fluid as may be used in many vertical scrubbers which are more commonly used in some applications.

In some embodiments, a wet condensing scrubber may include an array of nozzles suitable to provide a spray of liquid mist droplets, the array being aligned with and in proximity to an array of tubular members. The nozzle array may be separated from the array of tubular members. In some embodiments, one or more parts of either array may be configured for reproducible positioning in a desired orientation; that is, with members of one array oriented with respect to corresponding members of the other array. For example, in some embodiments, one or more tubes may be reversibly added or removed with respect to corresponding nozzles of a nozzle array without needing to take apart or remove other system components. Alternatively, the nozzle array may be removable without removal of the tubular array. Therefore, maintenance and/or repair of apparatus components may be simplified over some other scrubber designs.

In some embodiments, a wet condensing scrubber may include a nozzle array, wherein nozzles of the array may direct a spray of fine mist liquid droplets into an entrance opening of members of a tube array, and contact between tube walls and droplets may, for example, help to break up or disperse the droplets and/or change the direction of their travel. The tube array may be configured to limit resistance to material flow, and pressure on an inlet side of the tube array, when operated at a desired flow rate, may be lower than in some other condenser systems. In some embodiments, contact between tube walls and droplets may help to break up droplets thereby encouraging droplet dispersion. In addition, collisions with tube walls may change the relative direction of flue gas and droplet motion, thereby encouraging intersection of droplets and gas streamlines. Therefore, in some embodiments, directing materials within the tubular array may help to encourage proper mixing and agitation of flue gas and scrubber liquid droplets. Improved contact of flue gas components and scrubber liquid may encourage the dissolving of soluble gas species, and a significant drop in pressure and temperature across the scrubber may be achieved. In some embodiments, a system housing may also be used to help encourage a significant pressure drop as gas traverses through the tubular array; for example, the system may help pull a significant vacuum, with pressure on an inlet side of the system or backpressure being decreased accordingly.

That pressure reduction may, in some embodiments, help facilitate efficient coupling of a wet condensing scrubber and an ESP unit. For example, limiting backpressure on the ESP unit may help minimize pressure related effects in a corona discharge, including effects that may limit capture efficiency of particulates. And, in some embodiments, the flue gas output of a bagasse boiler may be directed through an ESP unit located upstream of a condensing scrubber unit. A significant increase in efficiency for both particulate and gas removal may then be achieved.

Figure 1:
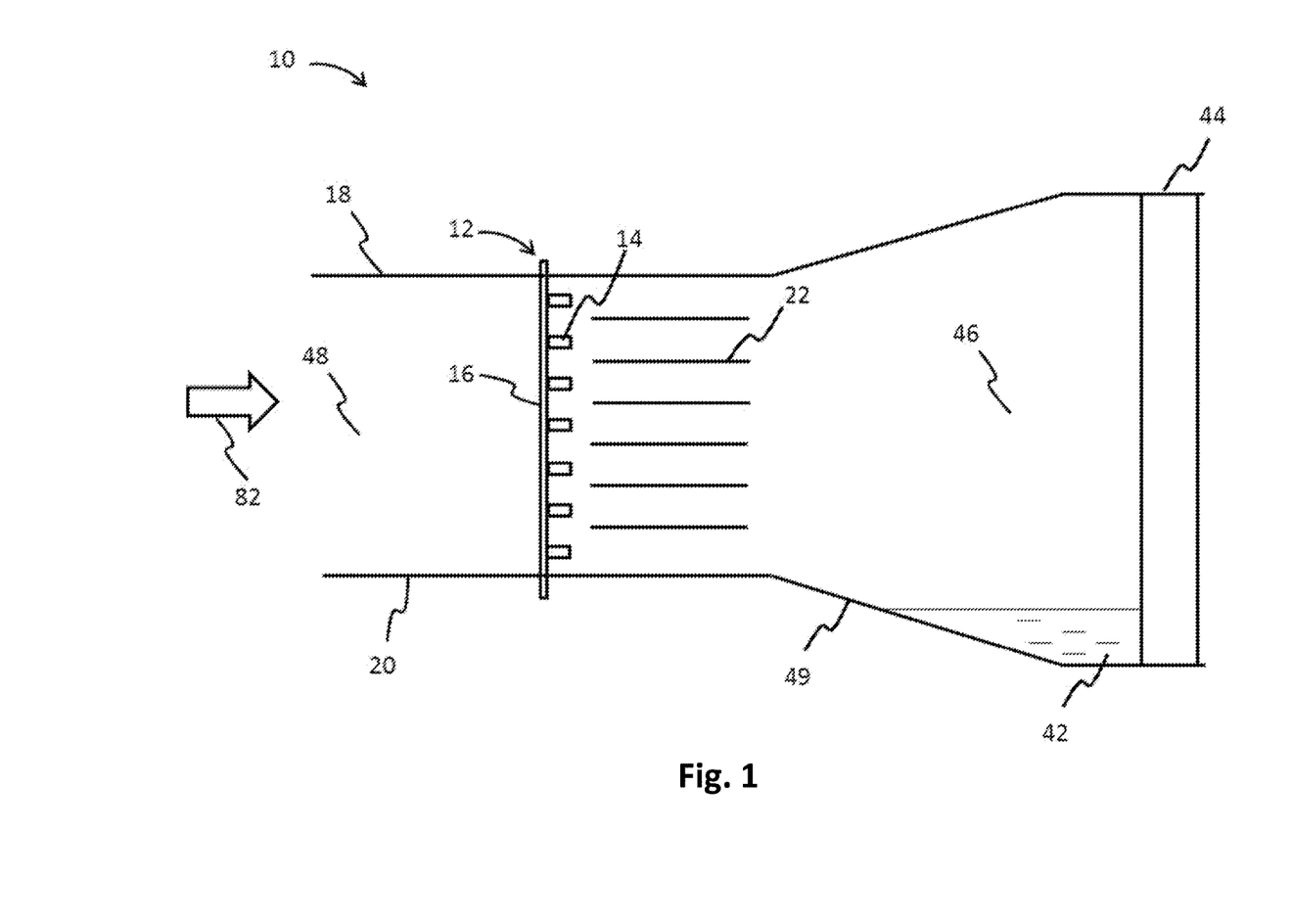
FIG. 1 is a schematic diagram of a wet condensing scrubber.

FIG. 1 shows an embodiment of a wet condensing scrubber 10. Scrubber 10 may promote interaction or mixing of flue gas and scrubber liquid while maintaining a low inlet side pressure. Moreover, by limiting an inlet side pressure of the scrubber 10, an ESP unit may be coupled to an upstream end of scrubber 10 without substantial loss of efficiency as otherwise may occur if serially connected to some other condensers which may be used in some systems. Also, both particulate and gaseous materials may be removed from a contaminant gas stream, including a stream resulting from combustion of sugar cane bagasse or other biomass. Sufficient removal may, for example, be achieved in a low cost assembly without the need for a vertically disposed housing, counter current flow of scrubber liquid and flue gas, and/or reliance on venturi-type mixing.

The wet condensing scrubber 10 may include one or more nozzle arrays 12. In some embodiments, two or more nozzle arrays may be connected in a series arrangement within the scrubber housing. By serially connecting the arrays 12, efficiency for removal of some species may be increased. However, in some embodiments, a flue gas processing system comprising a wet condensing scrubber 10 including a single array of nozzles vertically disposed in a horizontal housing may achieve effective particulate and contaminant gas removal from a flue gas stream derived from combustion of sugar cane bagasse or other biomass.

The nozzle array 12 may include a vertically disposed plurality of nozzles 14 configured for providing scrubbing liquid (e.g., water or other suitable liquid) as a mist or fine droplet spray. The nozzle array 12 may also include one or more support beams 16. A support beam 16 may, in some embodiments, be or include one or more feeder lines (e.g., pipes) configured to provide scrubber liquid to the nozzles 14 included in the array 12. The nozzles 14 may direct scrubber fluid in a direction that is substantially co-current or parallel to the flow direction of flue gas as indicated by arrow 82. Therefore, the direction of bulk flow of flue gas and scrubber liquid droplets may be substantially parallel to each other and substantially perpendicular to a normal vector of walls of apparatus housing. For example, each of the bulk flow of flue gas and scrubber droplets may be substantially perpendicular to a surface normal of each of top housing wall 18 and bottom housing wall 20. Housing walls 18, 20 may act together with side walls (not shown) to generally define a rectangular cavity. However, in some embodiments, a circular cavity or other suitably shaped cavity geometry may also be used.

Figure 1A:
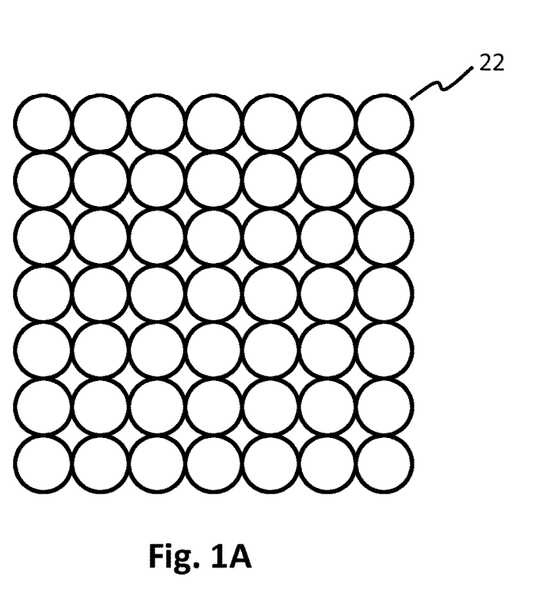
FIG. 1A is a cross section view of an embodiment of a tubular array.
Figure 1B:
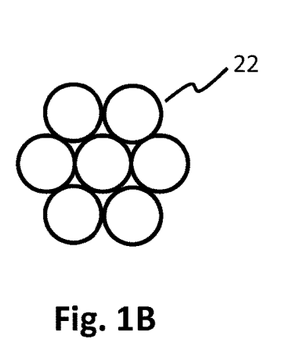
FIG. 1B is a cross section view of another embodiment of a tubular array.
Figure 1C:
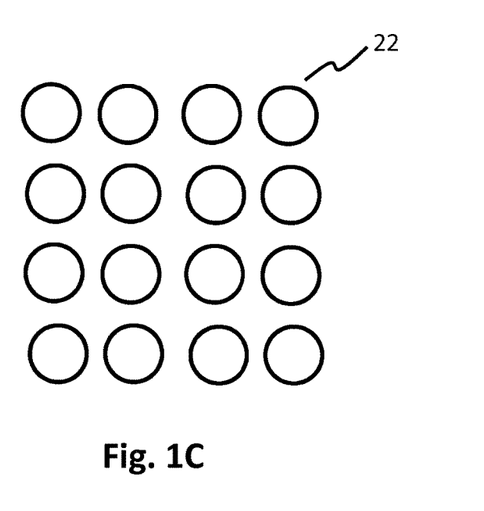
FIG. 1C is a cross section view of yet another embodiment of a tubular array.

In some embodiments, each of the plurality of nozzles 14 included in the nozzle array 12 may be arranged adjacent to a corresponding tube member among an array of tubular members 22. The array of tubular members 22 may, for example, include an array of pipe sections. For example, in some embodiments, PVC or CPVC piping or another suitable plastic material may be used. Tubular members 22 may be oriented to extend in length substantially parallel to the flow of flue gas; that is, opening to face the flow of oncoming gas. In some embodiments, the array of tubular members 22 may be made from an appropriate metallic material such as a sufficiently corrosion resistant material. Tubular members 22 may, in some embodiments, be cylindrical with a near constant inner diameter. For example, in some embodiments, individual tubes among the array of tubular members 22 may lack a restriction section. Examples of arrangements of tubular members 22 are shown in FIGS. 1A, 1B, and 1C. Of course, other suitable arrangements of tubular members 22 may be used.

Figure 2A:
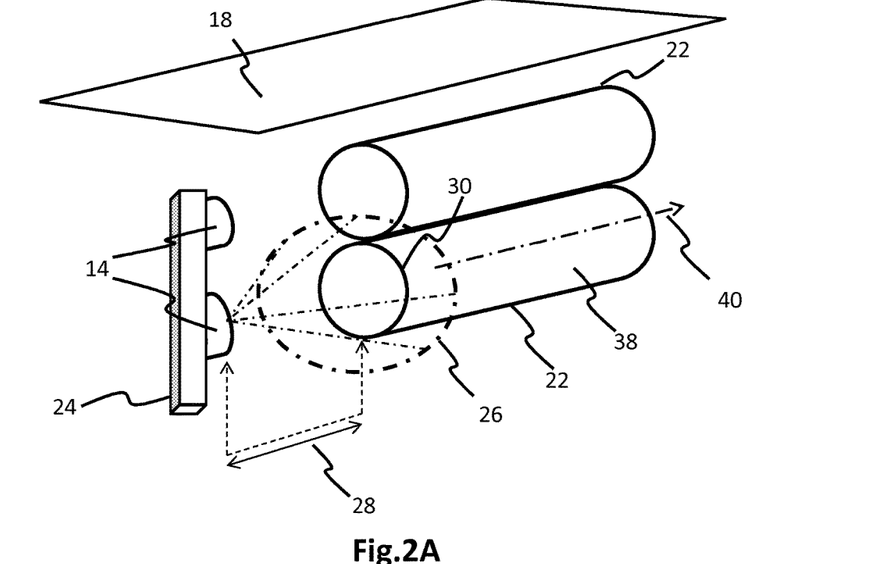
FIG. 2A is a perspective view of a portion of the wet condensing scrubber of FIG. 1.

FIG. 2A shows a perspective view of a portion 24 of a support beam 16 and exemplary nozzles 14 coupled to portion 24. The nozzles 14 of the nozzle array 12 may be mounted to a number of rows and/or columns of support beams, and a suitable number of nozzles 14 and tubular members 22 may be used as may be appropriate for a given size of wet condensing scrubber 10. For example, in one embodiment, 7 columns and 7 rows may be included in the array of nozzles 14 and tubular members 22. In some embodiments, the array of tubular members 22 may be tightly packed within a housing of the scrubber 10. Nozzles 14 and/or tubes 22 may, in some embodiments, be arranged in a grid of columns and rows (e.g., as shown in FIG. 1A) or may be arranged in a closest packing geometry (e.g., as shown in FIG. 1B) or other suitable geometry (e.g., as shown in FIG. 1C). In some embodiments, a nozzle 14 may be provided for each tube 22. Alternatively, a ratio of nozzles to tubes may be less than or greater than 1:1.

As shown in FIG. 2A, an individual nozzle 14 may be configured to provide liquid spray within a cone 26 (shown in dot-dashed lines) and may, in some embodiments, be spaced or offset a distance 28 from an opening 30 of one member of the array of tubular members 22. Alternatively, nozzles 14 may be partially or fully disposed within tubular members 22. In some embodiments, nozzles 14 may be spaced from the array of tubular members 22, but positioned within about 10 inches from the openings 30 of tubular members 22. And, in some embodiments, individual nozzles may be centered on individual openings 30 of tubular members 22. Nozzles 14 may be oriented and positioned with respect to tubular members 22 to minimize resistance of flow as flue gas passes through the interface of the arrays 12, 22. Support beams of the arrays 12, 22 may also be configured as appropriate to provide a desired resistance to material flow across the arrays. For example, by minimizing the width of support beams or by slightly displacing the arrays 12, 22 a resistance to flow may be diminished.

Nozzles 14 of various shapes and/or sizes may be used. Some nozzles 14 may include shafts that are significantly narrower than openings 30 of tube members 22, and those nozzles 14 may generally be moved close to or even inserted through the openings 30 of tube members 22 without significantly increasing resistance to flow. In addition, in the scrubber 10, the number and shape of nozzles 14 and tube members 22, the position and/or orientation of nozzles 14 and support beams 16, and/or the presence or absence of materials between tube members 22 or other factors may be selected to control resistance of material flow and/or to adjust pressure at an inlet side of the scrubber 10.

Figure 2B:
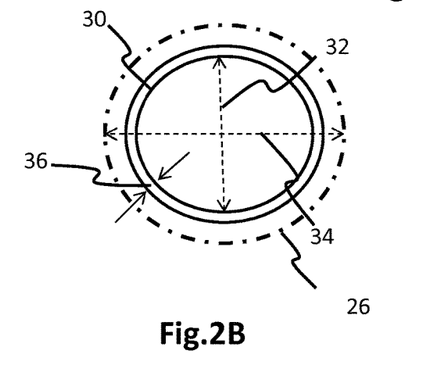
FIG. 2B is a cross section view of a tubular member near the opening of the tubular member and sprayed scrubber fluid overfilling the tube opening.

As shown in the cross sectional view of FIG. 2B, an opening 30 of a tubular member 22 may be characterized by an opening inner diameter 32. A tubular member 22 may further include walls of thickness 36. Depending upon the distance 28 and angle of cone 26 (see FIG. 2A), droplets of liquid may, at the entrance plane of opening 30, be substantially confined within a cone diameter 34. In some embodiments, the cone diameter 34 may be at least slightly greater than the diameter 32 of the opening 30. The intersection of cones from different nozzles 14 may serve to blanket an entrance plane near the interface of the arrays with liquid. Therefore, a substantially uniform wetting of flue gas may be achieved. In some embodiments, nozzles 14 may be configured to provide a wide angle solid cone of sprayed fluid. A blanket of droplets may be present as flue gas is directed towards the tubular members 22, and also sprayed fluid may still impact tube walls with sufficient velocity and angles to maintain droplet dispersion and to encourage gas and scrubber fluid interaction. In some embodiments, tubular members 22 may be packed close together. For example, tubular members 22 may rest upon other tubular members 22, and spaces between tubular members 22 may be minimized. Organizing tubular members 22 in a closest packing geometry may further function to minimize the area of spaces between tubular members 22. Furthermore, because spaces between tubes 22 may, in some embodiments, also be wetted, channeling of drier gas may be minimized.

Figure 2C:
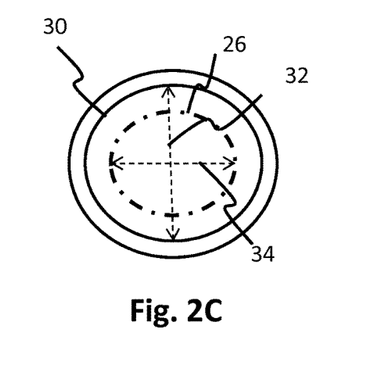
FIG. 2C is a cross section view of a tubular member near the opening of the tubular member and sprayed scrubber fluid confined within the tube opening.

In some embodiments, as shown in FIG. 2C, the diameter 34 of the spray cone at the plane of the opening 30 may be less than or up to the inner diameter 32 of opening 30, and therefore a majority of the spray liquid cone 26 may be directed through the tubular members 22. In some embodiments, spaces between tubes 22 may be minimized such as by adding packing materials between the tubes 22 or by closely packing the tube array 12. Channeling of flue gas between tubes 22 may be minimized, and confining the spray to within the tube diameter 32 may then help to ensure efficient and highly uniform wetting of material. In some embodiments, the spray liquid cone 26 may be restricted to a desired angle or distribution of angles as may be achieved, for example, by using nozzles 14 configured to provide a hollow cone spray.

Referring back to FIG. 2A, droplets of scrubber liquid may collide with walls 38 of the tubular members 22, and liquid may generally traverse through tubular elements 22 in a redirected path, but with bulk flow substantially in the direction 40 parallel to flue gas. A degree of interaction between flue gas and scrubber liquid droplets may, for example, be influenced by controlling the length and diameter of tube members 22, size distribution of sprayed droplets, pressure and velocity of droplets exiting nozzles 14, and angle that individual droplets collide with the wall 38. For example, some collisions between droplets and tubular member walls, e.g., those at relatively shallow angles, may be less effective at initiating mixing than collisions at other angles.

In some embodiments, the diameter 32 of an opening 30 for tubular members 22 may be about 15 inches to about 25 inches and the length of tubular members 22 may be about 2 feet to about 5 feet in length. In some embodiments, tubular member walls may be relatively thin, and the thickness 36 of walls 38 may be only a small fraction of the diameter of the tube members 22. For example, in some embodiments, tubular members 22 may comprise tubing that includes a wall thickness of about 0.05 to about 0.5 inches. Therefore, a ratio of a tubular member open area to a tubular member edge area may be fairly large, a factor that may further reduce backpressure. In some embodiments, suitable ratios of open area to edge area may, for example, be relatively easily met when using tubular members 22 with a diameter greater than several inches and where the ratio of the area of a tube opening to the area of a tube edge is greater than about 5.

In some embodiments, nozzles 14 may be selected from a group of nozzles including, but not limited to, solid cone and hollow cone nozzles, and may provide a shallow or wide angle as may be suited, for example, to partially fill or overfill the tube opening 30 as described above. Moreover, the velocity and angle of cone 26 may be configured to encourage a number of wall collisions between the walls 38 and sprayed liquid, but avoiding at least an excessive amount of pooled liquid within the tubular members 22. Therefore, in some embodiments, effective dispersion of fine droplets may be maintained, and intersection of droplets travel and streamlines of flue gas may be encouraged throughout the length of the tubes 22. In some embodiments, transfer of momentum between sprayed droplets and flue gas may assist flow through the tubular members 22. In some embodiments, nozzles 14 may be stainless steel Spiral Jet® type BSJ spray nozzles available from Spray Systems Company (Wheaton, Ill.). Nozzles 14 may, for example, in some embodiments, be configured to provide a hollow cone spray angle of about 50 degrees and may operate at a pressure of about 15 psi to about 45 psi.

In some embodiments, an amount of pooled liquid within an array of tubular members 22 which generally may not provide optimal surface area for interaction may be minimized. For example, liquid that does pool within the tubular members 22 may not provide an effective surface area to remove further contaminants, and therefore, pooling within the tubular members may, in some embodiments, be substantially avoided. However, any liquid that may become pooled in the tubular members 22 may generally drain from the tubes and be collected in a bottom reservoir 42 along with liquid separated from the gas stream by a demister 44, as shown in FIG. 1. The tubular member array 22 may be aligned substantially parallel to the bulk flow of flue gas. However, the tubular members 22 may, in some embodiments, also be slightly angled such as to increase drainage and/or minimize back flow of any pooled liquid if present.

Referring again to FIG. 1, gas and liquid material, upon exiting the array of tubular members 22, may escape into a downstream cavity 46. The downstream cavity 46 may, in some embodiments, include a cross sectional diameter that is greater than an upstream cavity 48 of the scrubber 10. Therefore, material exiting the array of tubular members 22 may, in some embodiments, be pulled into a region of greater cross sectional area, and the system may pull a significant vacuum, thus reducing system backpressure. Droplets may then be removed from the gas stream by use of demisting apparatus 44, and contaminant particles or gases that have become condensed in scrubber liquid may likewise be removed. Demisting apparatus 44 may, for example, include a series of deflection vanes which are placed in contact with the gas stream. Droplets may impact the vanes, drop downward due to gravity, and accumulate in the bottom reservoir 42. In some embodiments, the reservoir 42 may collect any liquid that drops following impaction with the demister 44, and the collection of liquid may be encouraged by use of a slanted bottom wall 49.

Scrubber liquid collected in the reservoir 42 may, in some embodiments, be processed and reused. For example, collected liquid may be cleaned and routed for re-use in the nozzle array 12. The scrubber liquid may be an aqueous fluid, and may, in some embodiments, include addition of one or more alkaline reagents. For example, where a contaminant stream is known to include an amount of acidic reagents, including, for example, hydrochloric acid, it may be desired to apply scrubber liquid that is at least slightly alkaline. More generally, any of various chemistries appropriate for removal of possible contaminants in a gas stream may be used herein. And, because the scrubber 10 may generally provide only minimal resistance to flow, it may advantageously be applied to different chemistries, even those that may not be compatible when otherwise used together. For example, low resistance arrays configured to provide fluid associated with complementary chemistries may be connected in series without unduly raising resistance to flow. Therefore, a series array of scrubbers may be coupled together without overly burdening the system or necessitating multiple fans to encourage material transport. Different fluids may be collected together in a single reservoir or partitioned into different reservoirs as may be appropriate for use of different reagents.

Figure 3:
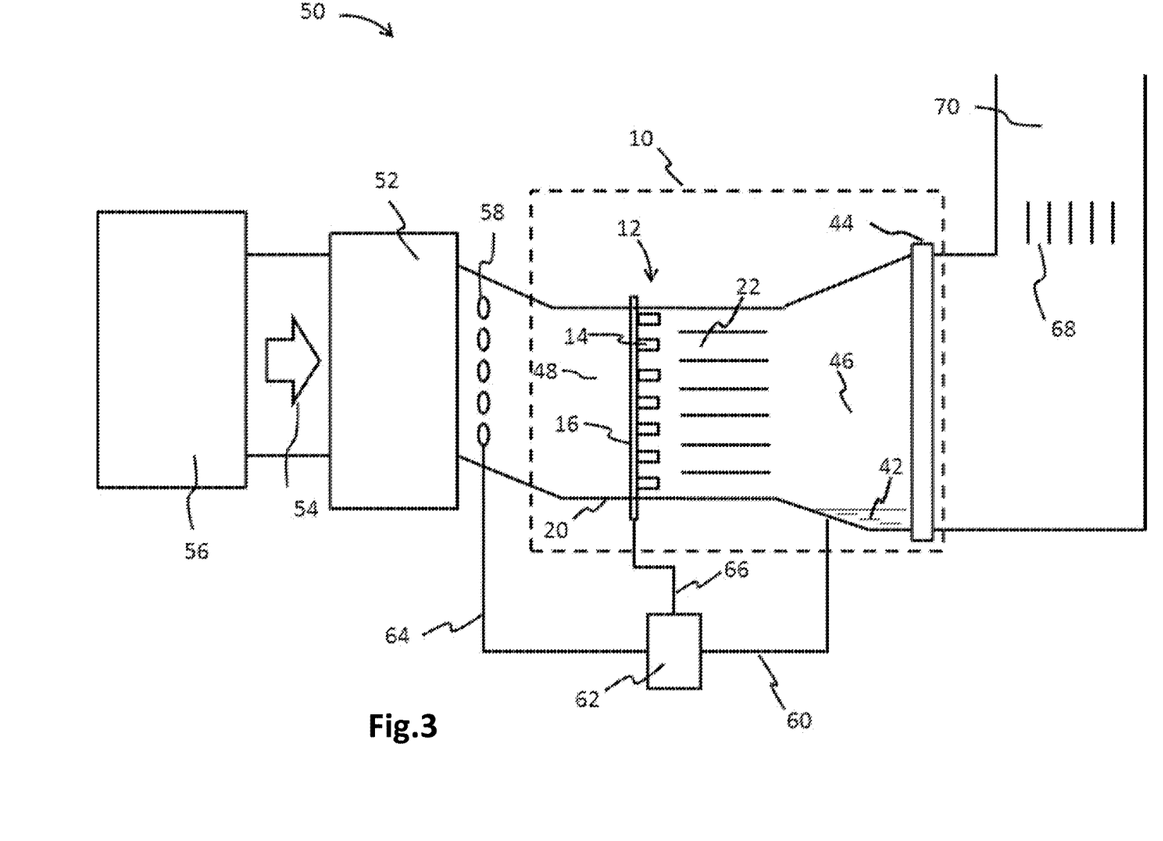
FIG. 3 is a schematic diagram of a system for treatment of contaminant gases.

FIG. 3 shows an embodiment of a flue gas cleaning system 50. The system 50 includes a horizontal wet condensing scrubber 10 (as described above) in series with an ESP unit 52. The ESP unit 52 may be positioned to receive a flue gas stream 54 that may, for example, be output from a biomass boiler 56. Biomass boiler 56 may, in some embodiments, be suitable for processing of sugar cane bagasse. The boiler 56 may, for example, be operated at a temperature of about 700° F. to about 800° F. and a pressure of about 600 psi to about 700 psi. The biomass boiler 56 may further be configured to provide heat and/or electricity for various needs. For example, the boiler 56 may be used to generate steam suitable to drive a turbine, and the energy provided by the turbine may be used by an onsite sugar mill or may be used to provide electricity for other uses.

ESP unit 52 may, in some embodiments, accept flue gas at temperatures of about 300° F. to about 350° F. and may operate at elevated pressure. However, the efficiency of the ESP unit 52 may generally suffer if the pressure is elevated too high, and as described above, to improve efficiency it may be desirable to minimize backpressure on ESP unit 52. In some embodiments, one or more fans may be included within the ESP unit 52 or other system housing. Fans may help to control flow of material through the system 50 and may be adjusted as needed.

In some embodiments, backpressure may at least in part be diminished by reducing the temperature of flue gas exiting the ESP unit 52. For example, in some embodiments, flue gas may exit the ESP unit 52 at elevated temperatures and may be directed through a group of spray bars 58. The spray bars 58 may be configured to mix liquid (e.g., water) into the flue gas stream and may be used to reduce the temperature of flue gas. For example, in some embodiments, the temperature of flue gas may be reduced from a first temperature of about 300°-350° F. to a second temperature of about 120°-180° F. In addition to reducing pressure, lowering the temperature may help promote dissolving of contaminant materials within the scrubbing liquid provided in the scrubber 10. Once used, spray liquid may, in some embodiments, be directed into one or more collection reservoirs and may be recycled. And, in some embodiments, a system housing may include one or more angled floor sections to direct the sprayed liquid to the one or more reservoirs. For example, in some embodiments, cooling liquid provided by the spray bars 58 may be directed to the reservoir 42, and such sprayed liquid may be processed and recycled along with fluid provided to the nozzle array 12.

Referring again to FIG. 3, flue gas exiting the ESP unit 52 may be directed into upstream cavity 48 (located upstream of the arrays 12, 22) which may serve as an entrance housing to direct flue gas through the arrays 12, 22. Following mixing of liquid and gas in the arrays 12, 22, flue gas may then be directed into the downstream cavity 46. In some embodiments, the relative cross sections of upstream cavity 48 and downstream cavity 46 may help to increase the pressure drop across the system 50. For example, in some embodiments, the downstream cavity 46 may include a cross sectional area that is up to about 50% greater or between about 10% to about 40% greater than that of upstream cavity 48. And, for example, by increasing the pressure drop across the system, backpressure may also be reduced.

To remove liquid from the gas stream, the demister 44 or entrainment separator may be used. Within the demister 44, vanes may be placed in the path of oncoming flue gas as well as mist droplets. The droplets along with entrained contaminants may be directed against the vanes, and liquid may collect and fall therein, draining into the reservoir 42. In some embodiments, liquid collected in the reservoir 42 may be directed through one or more conduits 60 to a settling pond 62. Within the settling pond 62, liquid may be decontaminated and/or otherwise processed and conditioned for use or re-use and provided via the conduit lines 64, 66 to either or both of the nozzle array 12 and spray bars 58.

In some embodiments, flue gas may pass through the demister 44 and may be directed through one or more vanes 68. The vanes 68 may be configured to straighten the gas flow and may, for example, be used to inhibit cyclonic action at the base of the stack 70. Stack 70 may be configured for venting of exhaust gas to the environment.

Figure 4:
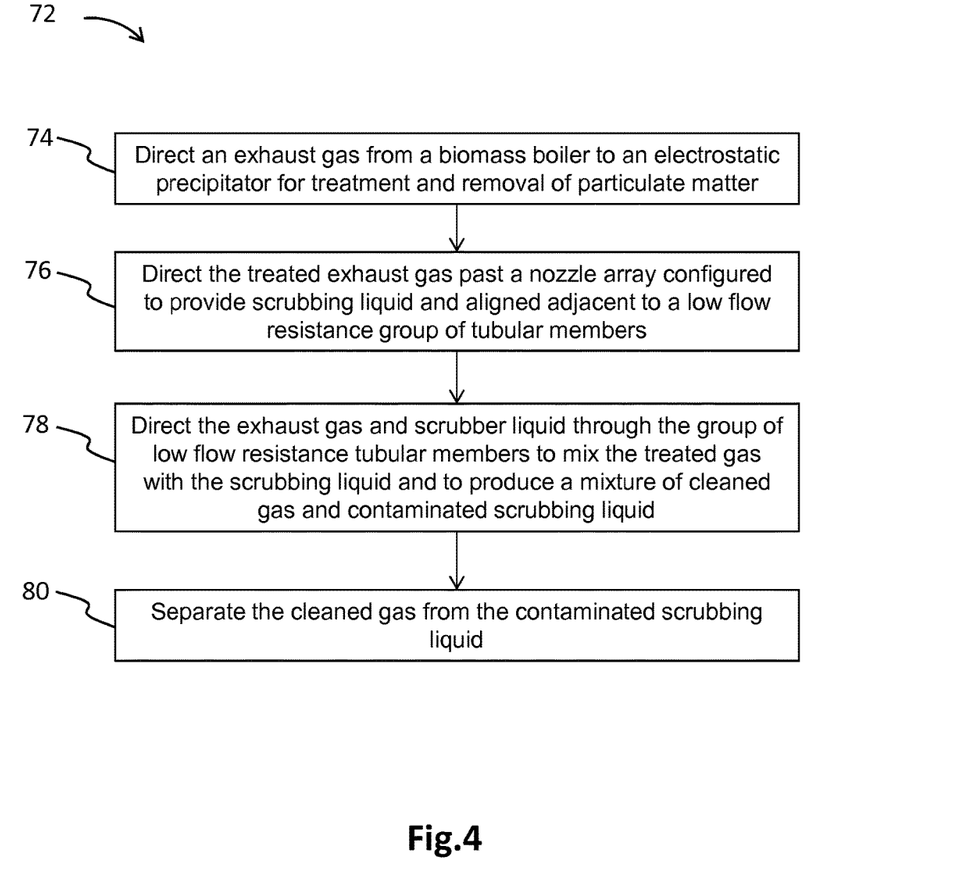
FIG. 4 is a flowchart of a method for removal of contaminants from a contaminated gas stream.

FIG. 4 shows an embodiment of a method 72 of removing contaminants from a contaminated gas stream. The gas stream may, for example, be derived from combustion of a biomass material. In some embodiments, the biomass material may be sugar cane bagasse and a gas stream may include up to about 8%, up to about 10%, or up to about 12% ash and/or dirt. In a step 74, contaminated gas such as exhaust gas from a biomass boiler may be directed to an ESP unit configured for treatment and removal of contaminant impurities such as particulate matter from the contaminated gas. The ESP unit may be configured to operate in either of a dry or wet environment, but particular advantages of the method 72 may include the coupling of an ESP unit that ideally operates within particular levels of moisture and/or pressure with downstream units that may add a scrubbing fluid.

In a step 76, treated exhaust gas may be directed past one or more nozzle arrays aligned adjacent to one or more groups of low flow resistance tubular members. The nozzle array may be configured to provide a fine mist spray of scrubbing fluid. In the step 78, scrubber fluid and gas may be directed through the tubular members. Within the tubular members, repeated collisions of scrubber fluid and tubular member walls may direct droplets of scrubber fluid along a deviated path within the length of the tubular members. And, droplets of the sprayed fluid may generally be directed across streamlines of gas flow, promoting increased interaction of fluid and contaminants. As contaminant gases dissolve within and particulates become trapped within the scrubbing fluid, an intermixed stream of clean gas and scrubber fluid and contaminants may be produced.

In a step 80, contaminated scrubber fluid may be removed from the gas stream, producing a purified stream of gas. Any of various suitable demisters or entrainment separators may be used to remove scrubber fluid from the cleaned gas stream. The cleaned gas may then, for example, be directed through a flue gas stack and released to the environment.

Additional information related to the methods and apparatus described herein may be understood in connection with the example provided below.

EXAMPLE

In this example, sugar cane was brought into a mill from nearby farms and converted into sugar and molasses. The fibrous residual from the sugar cane that is left over following processing is known as bagasse and was used as fuel in a boiler. Heat from combustion of the bagasse was used to drive a steam turbine and produce electricity. The exhaust steam produced from the steam turbines may further be captured and used for heating in the manufacturing process for converting the sugar cane juice to sugar and molasses. In this example, bagasse was used as fuel in the boiler which operated at a temperature of about 750° F. and a pressure of about 650 psi. The exhaust gas stream included various contaminants, some of which may be above levels suitable for release into the atmosphere.

An emissions test was performed for the purpose of determining the concentrations of total particulate matter and oxides of sulfur dioxide being emitted to the atmosphere. In this example, testing was conducted in two different experimental configurations. In a first configuration, exhaust gas was directed into an ESP unit and routed through a conventional flue gas stack above the ESP unit prior to collection and analysis. In that first configuration, contaminants were found to be higher than desired for both total particulate matter as well as sulfur dioxide. Therefore, a second or modified configuration was designed to decrease levels of both particulates and sulfur dioxide gas emissions.

A low cost scrubber system was designed with the intent of minimizing system backpressure to be compatible with an existing ESP unit with only limited changes in supporting ductwork and/or other structural support elements. In the modified or second configuration in this example, exhaust gas was directed into an ESP unit and, instead of venting the exhaust through a stack above the ESP unit, it was further routed through a scrubbing condenser generally as shown in FIG. 1. In addition, a series of straightening vanes was also added at the stack base to help prevent cyclonic action in the flue gas stack, as shown in FIG. 3. The scrubbing condenser used in this example included an array of 7 columns and 7 rows of nozzles and associated tubular members, as shown in FIG. 1A. Nozzles included in the nozzle array were Spiral Jet® type BSJ spray nozzles (part number 3/8 BSJ-SS-50-82) available from Spray Systems Company (Wheaton, Ill.). The 49 tubes in the array were comprised of PVC tube about 20 inches in diameter and about 4 feet in length. Individual nozzles were centered on an associated tube and configured to provide a hollow cone spray angle of about 50 degrees. Nozzles were operated at a pressure of about 20 psi, and each nozzle in the array provided about 12 gallons of scrubbing fluid (water) per minute. Scrubbing liquid was captured and recycled in the modified or second configuration.

In each configuration, sampling of flue gas was made using ports about 79 feet above the ground and about 16 feet 10 inches upstream from the stack outlet. The sampling followed procedures set forth in the Code of Federal Regulations, Title 40, Chapter I, Part 60, Appendix A, Methods 1, 2, 3A, 4, 5, 6C, 7E, 10, and 25A; Part 51, Appendix M, Method 202; and in the "Sampling Procedures Manual, Texas Air Control Board," Revised July 1985. Those references are herein incorporated by reference.

A summary of results obtained from monitoring exhaust gas derived from the test boiler and processed in the first configuration for three separate runs is shown in Table 1 below.

TABLE 1

| Emission Parameter | Run Number 1 | Run Number 2 | Run Number 3 | Average | Allowable Rate |
|---|---|---|---|---|---|
| Total Particulate Matter Emissions gr/dscf[1] | 0.0287 | 0.0375 | 0.0219 | 0.0294 | — |
| Total Particulate Matter Emissions - lbs/hr | 23.33 | 30.81 | 18.16 | 24.10 | ≤16.20 |
| Sulfur Dioxide Emissions - lbs/hr | 24.05 | 18.19 | 16.71 | 19.65 | ≤11.00 |

[1]29.92" Hg, 68° F. (760 mm Hg, 20° C.)

A summary of results obtained from monitoring exhaust gas derived from the test boiler and processed in the second or modified configuration for three separate runs is shown in Table 2 below.

TABLE 2

| Emission Parameter | Run Number 1 | Run Number 2 | Run Number | Average | Allowable Rate |
|---|---|---|---|---|---|
| Total Particulate Matter Emissions gr/dscf[1] | 0.0096 | 0.0085 | 0.0154 | 0.0112 | — |
| Total Particulate Matter Emissions - lbs/hr | 7.85 | 6.93 | 12.59 | 9.12 | ≤16.20 |
| Sulfur Dioxide Emissions - lbs/hr | 9.69 | 9.98 | 5.90 | 8.52 | ≤11.00 |

[1]29.92" Hg, 68° F. (760 mm Hg, 20° C.)

As shown in Table 1, without the wet condensing scrubber, levels of both particulate emission and sulfur dioxide were well above allowable rates. However, in the modified configuration with the wet condensing scrubber, as shown in Table 2, both particulate emission and emission of sulfur dioxide were significantly reduced and well below allowable rates.

Exhaust amounts are generally proportional to the rate of steam produced by the boiler. For example, when the boiler generates greater amounts of steam, the exhaust increases. And, therefore, to calibrate and correct for different operating conditions, amounts of contaminants may be related to the rate of steam production. For example, testing of flue gas derived from the test boiler in the first configuration was conducted at a steam rate of about 262,162 lbs steam/hr. Testing of flue gas derived from the test boiler in the second configuration was conducted at a steam rate of about 305,030 lbs steam/hr. For the two test configurations, emissions may be converted to units of (lb/MMBTU) using the following formula:

$$(lb/MMBTU) = [(lb\ pollutant/hr\ during\ testing) \times$$
$$(2\ lb\ steam/lb\ bagasse) \times$$
$$(2,000\ lb/ton)] \div [(lb\ steam/hr\ during\ testing) \times$$
$$(7\ MMBTU/ton\ bagasse)]$$

Upon normalizing the two configurations based on steam rate, amounts of total particulates and sulfur dioxide emissions may then be calculated as shown above and expressed in units of pounds of contaminant per millions of British thermal units (BTU) produced per hour as shown in Table 3 below:

TABLE 3

|  | Configuration #1 | Configuration #2 | % reduction |
|---|---|---|---|
| PMTOTAL | 0.053 (lb/MMBTU) | 0.017 (lb/MMBTU) | 67.49% |
| SO2 | 0.043 (lb/MMBTU) | 0.016 (lb/MMBTU) | 62.70% |

As shown in Table 3, addition of the scrubber was found to result in about a 67% reduction in total particulate matter and also about a 63% reduction in sulfur dioxide emissions, as compared to the system without the scrubber. Importantly, the modified configuration was found to result in increased removal of undesirable constituents in the stack gas, and it may provide a low cost alternative to other more costly methods for processing of flue gas from the combustion of sugar cane bagasse or other biomass.

While many examples in this document refer to certain apparatuses and methods, it is understood that those apparatuses and methods are described in an exemplary manner only and that other variations may be used. For example, any feature in one embodiment may be included in any other embodiment. Additionally, other elements may be used, depending on the particular needs. Although the foregoing specific details describe certain embodiments, persons of ordinary skill in the art will recognize that various changes may be made in the details of these embodiments without departing from the spirit and scope of this invention as defined in the appended claims and considering the doctrine of equivalents. Therefore, it should be understood that this invention is not limited to the specific details shown and described herein.

What is claimed is:

1. A horizontal scrubber system for removing sulfur dioxide and particulate matter from a gas stream comprising:
    a housing including an inlet configured to receive a gas stream derived from the combustion of sugar cane bagasse and an outlet, wherein a bulk flow of the gas stream flows substantially horizontally from said inlet to said outlet;
    a manifold of liquid nozzles disposed within said housing and configured to provide a spray of liquid droplets in a co-current orientation to said gas stream; and
    an array of tubular members oriented adjacent said manifold of liquid nozzles;
    wherein each individual nozzle included among said manifold of liquid nozzles is substantially centered with respect to a respective tubular member of said array of tubular members;
    wherein the tubular members of said array of tubular members extend lengthwise in a direction substantially parallel to the bulk flow of the gas stream.

2. The horizontal scrubber system of claim 1 wherein the tubular members of said array of tubular members include circular walls with a substantially uniform cross section along their length.

3. The horizontal scrubber system of claim 1 wherein the tubular members of said array of tubular members are arranged in a grid of rows and columns.

4. The horizontal scrubber system of claim 1 wherein the tubular members of said array of tubular members are packed together in a closest packing geometry.

5. The horizontal scrubber system of claim 1 wherein said manifold of liquid nozzles is offset from said array of tubular members; and
    wherein said nozzles are configured to provide a cone of liquid spray, the spray from adjacent nozzles intersecting outside of respective openings of respective tubular members of said array of tubular members.

6. The horizontal scrubber system of claim 1 wherein said manifold of liquid nozzles is offset from said array of tubular members; and
    wherein said nozzles are configured to provide a cone of liquid spray that directs fluid inside of respective openings of respective tubular members of said array of tubular members.

7. The horizontal scrubber system of claim 1 wherein the tubular members of said array of tubular members have a substantially circular cross section with a diameter of about 15 inches to about 25 inches;
    wherein a length of the tubular members of said array of tubular members is between about 2 feet to about 5 feet.

8. The horizontal scrubber system of claim 1 wherein said outlet includes a cross sectional area that is up to about 50% greater than that of said inlet.

9. The horizontal scrubber system of claim 1 wherein said outlet includes a cross sectional area that is about 10% to about 40% greater than that of said inlet.

10. A system for processing flue gas comprising:
    an electrostatic precipitator configured to receive an exhaust gas stream from a biomass boiler;
    a manifold of liquid nozzles;
    a housing including an upstream and a downstream flow path that is substantially horizontal;
    wherein said manifold of liquid nozzles is disposed within the upstream flow path of said housing;
    wherein the manifold of liquid nozzles is configured to provide scrubber liquid in a co-current orientation to said exhaust gas stream; and an array of tubular members oriented adjacent said manifold of liquid nozzles and configured to receive said scrubber liquid and said gas stream;

wherein tubular members of said array of tubular members include substantially circular walls with a cross sectional diameter of between about 15 inches to about 25 inches;

wherein tubular members of said array of tubular members have a length of about 2 feet to about 5 feet; and a demister disposed along the downstream flow path of said housing and configured to remove said scrubber liquid from the exhaust gas stream.

11. The system of claim 10 further comprising one or more spray bars located between said electrostatic precipitator and said manifold of liquid nozzles.

12. The system of claim 10 wherein the downstream flow path of said housing includes a cross sectional area that is up to about 50% greater than a cross sectional area of said upstream flow path of said housing.

13. A method of cleaning an exhaust gas stream derived from combustion of biomass comprising:

directing exhaust gas from a biomass boiler to an electrostatic precipitator for treatment and removal of particulate matter;

directing the exhaust gas past a nozzle array configured to spray a scrubbing liquid into said exhaust gas;

wherein the nozzle array is aligned adjacent to a group of low flow resistance tubular members;

directing the exhaust gas and scrubbing liquid through said group of tubular members;

wherein the tubular members are configured to encourage mixing of the exhaust gas with the scrubbing liquid to produce a mixture of cleaned gas and contaminated scrubbing liquid; and separating the cleaned gas from the contaminated scrubbing liquid.

14. The method of claim 13 wherein said biomass is sugar cane bagasse.

15. The method of claim 13 wherein said tubular members comprise cylindrical tubes of substantially uniform cross section of between about 15 inches and about 25 inches in diameter and having a length of about 2 feet to about 5 feet.

16. The method of claim 15 further comprising directing the mixture of cleaned gas and contaminated scrubbing liquid through a housing positioned adjacent said low flow resistance tubular members;

wherein said housing increases in cross sectional area by up to about 50% along the flowpath for the cleaned gas; and wherein said housing and said low flow resistance tubular members are configured to increase a drop in pressure across said low flow resistance tubular members.

* * * * *